United States Patent
Ranjan et al.

(10) Patent No.: US 9,511,322 B2
(45) Date of Patent: Dec. 6, 2016

(54) DEHUMIDIFICATION SYSTEM FOR AIR CONDITIONING

(71) Applicant: Carrier Corporation, Farmington, CT (US)

(72) Inventors: Rajiv Ranjan, Vernon, CT (US); Gary D. Winch, Colchester, CT (US)

(73) Assignee: CARRIER CORPORATION, Farmington, CT (US)

( * ) Notice: Subject to any disclaimer, the term of this patent is extended or adjusted under 35 U.S.C. 154(b) by 179 days.

(21) Appl. No.: 14/176,210

(22) Filed: Feb. 10, 2014

(65) Prior Publication Data

US 2014/0223947 A1    Aug. 14, 2014

Related U.S. Application Data

(60) Provisional application No. 61/764,311, filed on Feb. 13, 2013.

(51) Int. Cl.
  *B01D 53/26*    (2006.01)
  *F24F 3/14*     (2006.01)
  *F24F 5/00*     (2006.01)

(52) U.S. Cl.
  CPC .......... *B01D 53/263* (2013.01); *F24F 3/1417* (2013.01); *F24F 5/001* (2013.01); *F24F 2003/1435* (2013.01); *Y10T 137/87571* (2015.04)

(58) Field of Classification Search
  CPC ....... B01D 53/263; F24F 3/1417; F24F 5/001; F24F 2003/1435; F24F 6/12; F24F 11/00; F24F 6/00
  See application file for complete search history.

(56) References Cited

U.S. PATENT DOCUMENTS

| | | | | |
|---|---|---|---|---|
| 4,466,202 A | * | 8/1984 | Merten | F26B 21/04 34/470 |
| 6,080,320 A | * | 6/2000 | von Phul | B01D 19/0005 202/264 |
| 2009/0151388 A1 | * | 6/2009 | Platt | F25B 29/003 62/498 |

FOREIGN PATENT DOCUMENTS

| | | | | |
|---|---|---|---|---|
| EP | WO03044437 A1 | * | 5/2003 | ............... F24H 4/02 |
| EP | WO2011062808 A1 | * | 5/2011 | ........... B01D 53/263 |
| EP | 2339252 A1 | | 6/2011 | |
| EP | WO2012042553 A1 | * | 4/2012 | ........ B01D 53/1425 |
| EP | WO2012042553 A1 | * | 4/2012 | ........ B01D 53/1425 |
| GB | 1152440 | * | 5/1969 | |
| GB | 1152440 A | * | 5/1969 | ............ F24F 3/1417 |

(Continued)

OTHER PUBLICATIONS

European Search Report for application EP 14155015.2, mailed Jul. 3, 2014, 6 pages.

*Primary Examiner* — Emmanuel Duke
(74) *Attorney, Agent, or Firm* — Cantor Colburn LLP

(57) ABSTRACT

An air temperature and humidity control device is provided including a heat pump and a humidity controller. The heat pump has a condenser, a first evaporator, a compressor, and a second evaporator. The humidity controller includes a first contactor fluidly coupled to the second evaporator. The first contactor includes at least one contact module having a porous sidewall that defines an internal space through which a liquid desiccant flows. A liquid source is coupled to the first contactor such that a second liquid provided by the liquid source flows through the first contactor adjacent an external side of the porous sidewall. Heat and/or water vapor transfers between the second liquid and the liquid desiccant.

12 Claims, 4 Drawing Sheets

(56) References Cited

FOREIGN PATENT DOCUMENTS

| WO | 2011062808 A1 | | 5/2011 |
|----|---------------|---|--------|
| WO | WO2011062808 A1 | * | 5/2011 |
| WO | 2012042553 A1 | | 4/2012 |
| WO | WO2012042553 A1 | * | 4/2012 |
| WO | 2012125909 A2 | | 9/2012 |

* cited by examiner

DEHUMIDIFICATION SYSTEM FOR AIR CONDITIONING

CROSS-REFERENCE TO RELATED APPLICATIONS

This application claims the benefit of U.S. provisional patent application Ser. No. 61/764,311 filed Feb. 13, 2013, the entire contents of which are incorporated herein by reference.

BACKGROUND OF THE INVENTION

The invention relates generally to an air temperature and humidity control device, and more particularly, to an air temperature and humidity control device including a liquid-liquid contactor.

Conventional air conditioning systems generally do not perform humidity control functions. In case humidity control is desired, air conditioners based on direct expansion (DX) may be operated to condense moisture in the air through supercooling. The drier, supercooled air is then reheated for comfort before entering into a facility to be air conditioned. Significant energy is consumed during the supercooling and reheating, which renders the process inefficient. Moreover, water condensation on metallic DX coils may cause corrosion problems, which adds to the maintenance cost of the air conditioning systems.

In light of the need for more efficient humidity control, air conditioning systems with desiccant wheels separated from temperature control units have been developed. The desiccant wheel is loaded with a solid desiccant and is positioned just downstream of the temperature control unit so that cooled air transversely passes a ¾ section of the rotating desiccant wheel, during which the moisture in the air is absorbed by the desiccant. The remaining ¼ section of the desiccant wheel is reheated so that the absorbed moisture can be desorbed to regenerate the desiccant. While capable of achieving low humidity outputs, systems based on desiccant wheels may be space-consuming and may suffer from lack of efficiency, as heating energy is required to regenerate the desiccant. Moreover, because the desiccant wheel is relatively cumbersome and not easy to install or uninstall, the capacity and operation of the systems based on desiccant wheels are generally not modular enough to accommodate a wide range of operations.

Besides desiccant wheels, humidity control may be achieved with an air conditioning system having a heat pump coupled to a liquid desiccant loop so that the liquid desiccant, such as lithium chloride, can be cooled and heated by the heat pump. The desiccant loop includes two contact towers loaded with packing materials. Several sprinkler are provided at the top end of the tower to distribute the liquid desiccant (cooled or heated by the heat pump) onto the packing materials, while air is blown form the bottom end of the contact tower as the liquid desiccant trickles down the packing material. As a result of the direct contact between the desiccant and air, water may be absorbed from the air into the desiccant or desorbed from the desiccant into the air. Simultaneously, the air may be heated or cooled by the liquid desiccant.

Because of its integration with a heat pump, the liquid desiccant system discussed above requires less energy for the desorbing of water from the liquid desiccant, i.e. the regeneration of the liquid desiccant. However, as the operation of the system requires direct contact between numerous streams of liquid desiccant and air, significant amount of noises, e.g. bubbling noise, are generated by the system, which may disturb the ambience of the room or facility that is the subject of the system. The entrainment of liquid desiccant droplets into the air stream is inherent to spraying direct contact technologies. Such liquid desiccant entrainment (or liquid desiccant carryover) can cause corrosion of ductwork and human health issues. Moreover, similar to the desiccant wheels, the contact towers of the above-discussed system are relatively cumbersome in construction and not easy to modulate to accommodate a wide range of operations.

BRIEF DESCRIPTION OF THE INVENTION

According to one embodiment of the invention, an air temperature and humidity control device is provided including a heat pump and a humidity controller. The heat pump has a condenser, an evaporator, and a compressor. The humidity controller includes a first contactor fluidly coupled to the evaporator. The first contactor includes at least one contact module having a porous sidewall that defines an internal space through which a liquid desiccant flows. A vacuum pump is coupled to the first contactor. The vacuum pump is configured to generate a pressure difference between an internal side and an external side of the porous sidewall such that water vapor transfers between the vacuum and the liquid desiccant.

According to one embodiment of the invention, a liquid-liquid contactor for use in an air temperature and humidity control device is provided including a substantially enclosed body. At least one contact module is arranged within the body. The contact module has a porous sidewall that defines an internal space through which a first liquid flows. The porous sidewall defines an external space through which a second liquid flows.

According to another embodiment of the invention, an air temperature and humidity control device is provided including a heat pump and a humidity controller. The heat pump has a condenser, an evaporator, and a compressor. The humidity controller includes a first contactor fluidly coupled to the evaporator. The first contactor includes at least one contact module having a porous sidewall that defines an internal space through which a liquid desiccant flows. A liquid source is coupled to the first contactor such that a second liquid provided by the liquid source flows through the first contactor adjacent an external side of the porous sidewall. Heat and/or water vapor transfers between the second liquid and the liquid desiccant.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
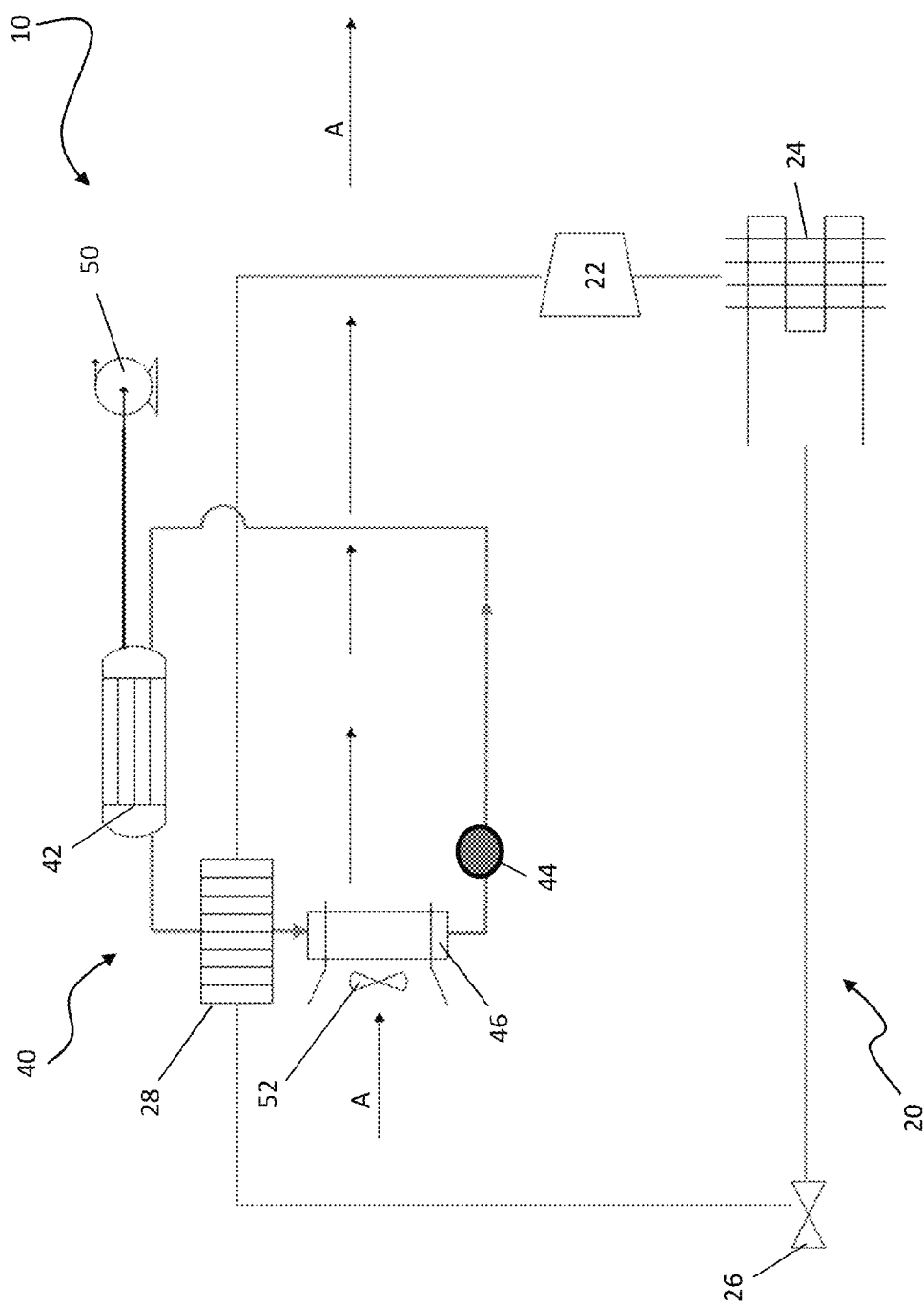
FIG. 1 is a schematic diagram of an air temperature and humidity control device according to an embodiment of the invention.

Referring now to the FIGS., an air temperature and humidity control device 10 includes a heat pump 20 and a humidity controller 40. The heat pump 20 includes a compressor 22, a condenser 24, an expansion valve 26, and an evaporator 28. In operation, a refrigerant R is circulated through the various components of the heat pump 20 in a known manner so that the refrigerant R is in a compressed state (releasing heat) in the condenser 24 and is in an expanded state (heat absorbing) in the evaporator 28. The refrigerant R is an environmentally friendly refrigerant based on R-410; however other refrigerants are within the scope of the invention.

The humidity controller 40 may include a first contactor 42 through which a liquid desiccant LD flows, such as an aqueous lithium chloride solution for example. Other hygroscopic liquid substances may also be used as the liquid desiccant and should be considered as within the scope of this invention. In one embodiment, the first contactor 42 is configured as a liquid-liquid contactor. The evaporator 28 thermally couples the heat pump 20 and the humidity controller 40 such that both refrigerant R and liquid desiccant LD flow there through in a heat exchange relationship. In another embodiment, illustrated in FIG. 2, the condenser 24 may also be a refrigerant-liquid desiccant heat exchanger configured to thermally couple the heat pump 20 and the humidity controller 40. As a non-limiting example, the condenser 24 and/or the evaporator 28 may be of a shell-and-tube heat exchanger, in which a bundle of tubes is disposed within an outer shell. In operation, one fluid flows through the tubes and another fluid flows along the tubes (through the shell) to allow heat transfer between the two fluids. Other suitable heat exchangers known to one of ordinary skill in the art are also within the scope of this invention.

As illustrated in the FIGS., the liquid desiccant LD may be driven by a fluid pump, illustrated schematically at 44, to flow sequentially through the first contactor 42 and the evaporator 28. However, it is to be understood that the fluid pump 44 may be arranged at another portion of the closed loop humidity controller 40, and that the directional flow of the fluid pump 44 may be reversed to allow the liquid desiccant LD to flow sequentially through the evaporator 28 and then the first contactor 42.

The disclosed device 10 may also include an external source 50 for generating a flow of a second liquid L2 through the first contactor 42. The flow of liquid L2 may be arranged in a parallel flow, counter flow, cross-flow, or any other known relationship relative to the flow of the liquid desiccant LD through the contactor 42. In one embodiment, illustrated in FIGS. 1 and 2, the external source 50 may include a vacuum pump coupled to the first contactor 42. In another embodiment, the vacuum pump may be substituted by a water generator 56 (FIG. 3). As the liquid from the external source 50 passes through the first contactor 42, heat and/or water transfers between the liquid L2 and the liquid desiccant LD in the first contactor 42 to allow the disclosed device 10 to provide a liquid L2 of a desirable temperature and/or humidity. In the illustrated, non-limiting embodiments, the first contactor 42 serves as a desorber, removing moisture and/or heat from the liquid desiccant LD to regenerate the liquid desiccant.

The humidity controller 40 may further include a second contactor 46 through which the liquid desiccant LD flows. The second contactor 46 may also be thermally coupled to the evaporator 28. As illustrated in FIG. 1, liquid desiccant LD may be driven by the fluid pump 44 to flow sequentially through the first contactor 42, the evaporator 28, and the second contactor 46. Here again, the fluid pump 44 may be reversed to allow the liquid desiccant LD to flow sequentially through the second contactor 46, the evaporator 28, and the first contactor 42.

In another embodiment, a blower 52 may be provided to generate an airflow A over the second contactor 46. The second blower 52 may include an electric fan positioned adjacent to the second contactor 46. The electric fan may be substituted by an air outlet of an HVAC system. In embodiments where the air temperature and humidity control device 10 is arranged within a building, the airflow A may be inlet air entering the building, or may be ambient air within the building. As the airflow A passes over the second contactor 46, heat and/or water transfers between the airflow A and the liquid desiccant LD in the second contactor 46 to allow the disclosed device 10 to provide a desirable air temperature and/or humidity. In one non-limiting embodiment, the second contactor 46 may serve as an absorber, such that moisture and heat from airflow A is transferred to the liquid desiccant LD.

Figure 4:
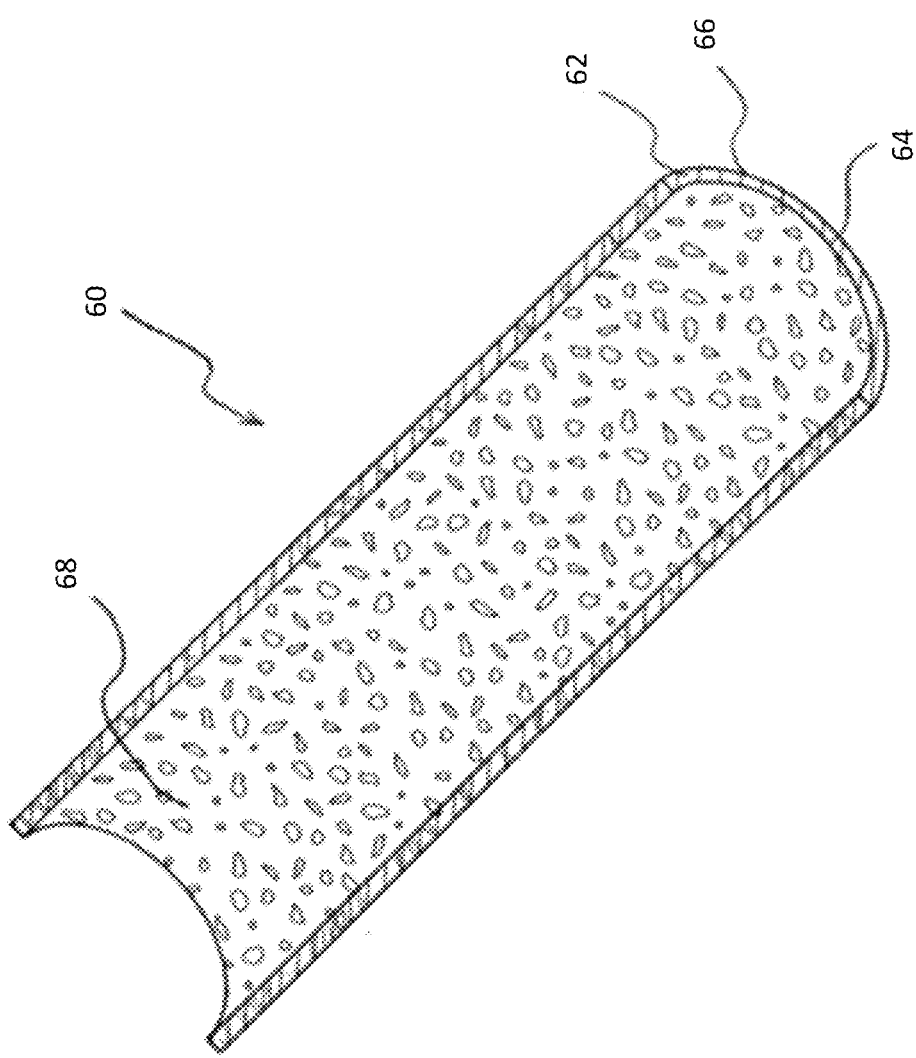
FIG. 4 is a perspective view of a cross-section of a contact module according to an embodiment of the invention.

In one non-limiting embodiment, illustrated in FIG. 4, each of the first and second contactors 42, 46 includes at least one contact module 60 having a porous sidewall 62 with an interior side 64 and an external side 66. The interior side 64 of the sidewall 62 defines an internal space 68 through which the liquid desiccant LD flows. The external side 66 similarly defines a space (not shown) through another liquid flows. In one embodiment, the contact modules 60 are substantially tubular in shape. However, contactors 42, 46 that use another known humidity absorbing/desorbing device, such as a packed tower for example, are within the scope of the invention. Each of the contactors 42, 46 may include at least one end connector (not shown) configured to establish fluid communication between the contact modules 60 and the conduits connected to the contactors 42, 46. Suitable connectors include pipe manifolds, chamber manifolds, or other connectors generally used in fluid transportation. Alternatively, one or both of the contactors 42, 46 may include only one contact module 60, directly connected to the desiccant conduits without any connector.

In order to facilitate humidification and dehumidification, the porous sidewall 62 of the contact module 60 may be permeable to water vapor, and impermeable to the liquid desiccant LD so as to form a closed liquid desiccant loop. Thus in one embodiment, the porous sidewall 62 is made of a hydrophobic porous material, such as a plastic porous material for example. Examples of suitable materials for the porous sidewall 40 include, but are not limited to, polypropylenes, polyethylene, polysulfones, poiyethersulfones, polyetheretherketones, polyirnides, potypheylene polytetrafluoroethylenes, polyvinytidene difluorides, and combinations thereof. In one embodiment, the porous sidewall 40 comprises thermally-resistant polymeric materials, such as polytetrafluoroethylenes, polyvinylidene difluorides, and combinations thereof.

Referring again to FIG. 1, the second contactor 46 is arranged generally downstream of the evaporator 28 so that the liquid desiccant LD may be cooled in the evaporator 28 to a temperature below the temperature of the airflow A passing through the second contactor 46. The liquid desiccant LD cools the at least one contact module 60 of the second contactor 46 as it flows there through. As a result, the cooled contact modules 60 are configured to absorb heat from the airflow A adjacent the exterior side 66 of the contact modules 60. The hygroscopic nature of the liquid desiccant LD may additionally cause the liquid desiccant to absorb water vapor from the airflow A. Thus, the at least one contact module 60 of the second contactor 46 decreases both the temperature and the humidity of the airflow A along its exterior side 66. In generally hot and humid environments, the device 10 may be configured so that the second contactor 42 is positioned close to an interior air vent of a facility to be air-conditioned so that the airflow A, after being cooled and dehumidified by the second contactor 46, can be introduced into the facility for comfort.

The first contactor 42 is arranged generally downstream of the second contactor 46. Because the liquid desiccant LD is heated in the second contactor 46, the need to overheat the liquid desiccant LD for moisture removal is eliminated. As the liquid desiccant LD flows through the first contactor 42, the flow L2 generated by the vacuum pump 50 creates a low pressure environment adjacent the external side 66 of the at least one contact module 60 within the first contactor 42. The pressure differential between opposing surfaces 64, 66 of the porous sidewall 62 causes the desiccant LD to release water vapor into the vacuum flow L2. The resultant liquid desiccant LD is more concentrated and hygroscopic than the desiccant entering the first contactor 42. In one embodiment, the vacuum pump 50 may be configured to release the additional water vapor of the vacuum flow L2 into the ambient, external air.

Figure 2:
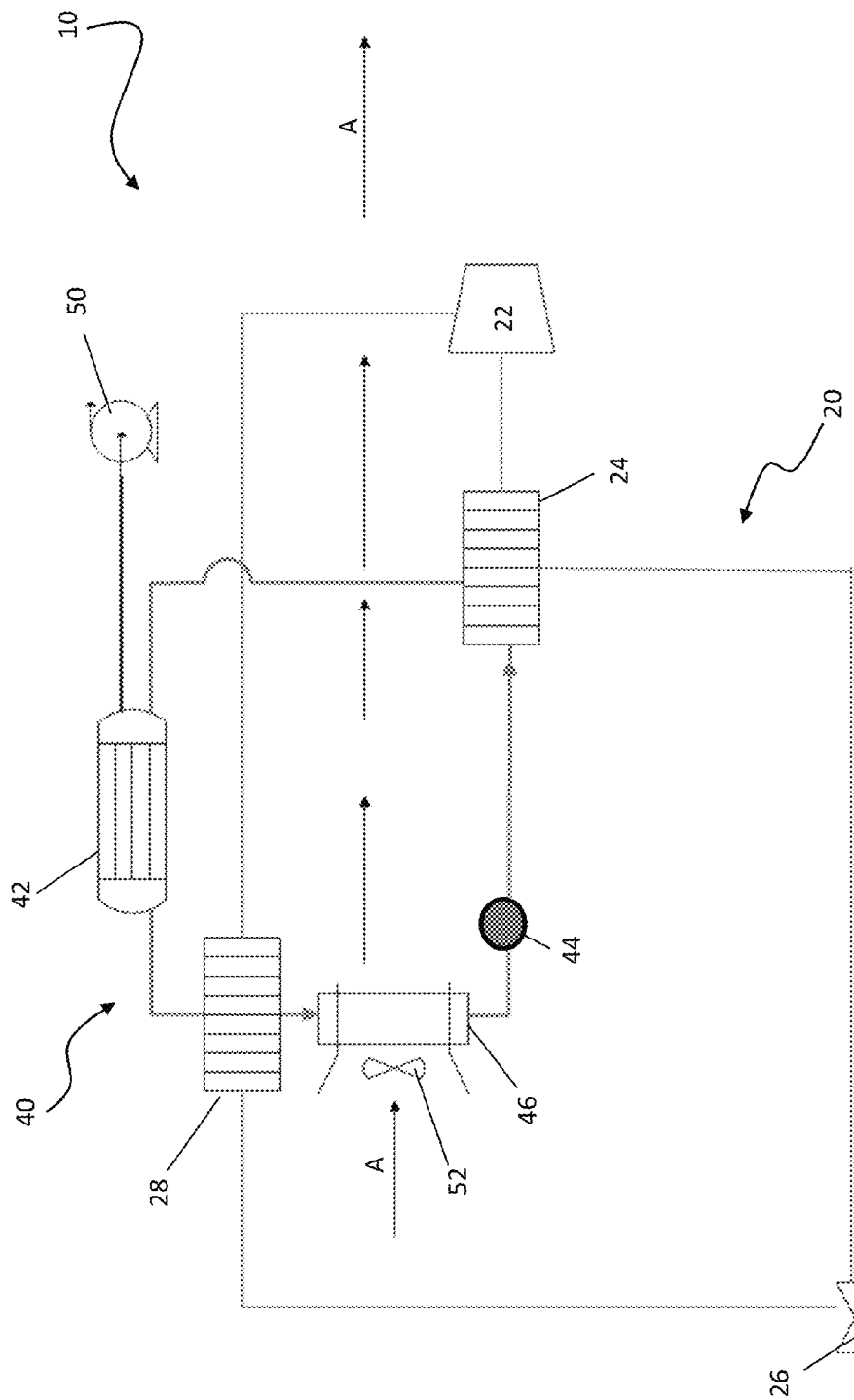
FIG. 2 is a schematic diagram of another air temperature and humidity control device according to an embodiment of the invention.
Figure 3:
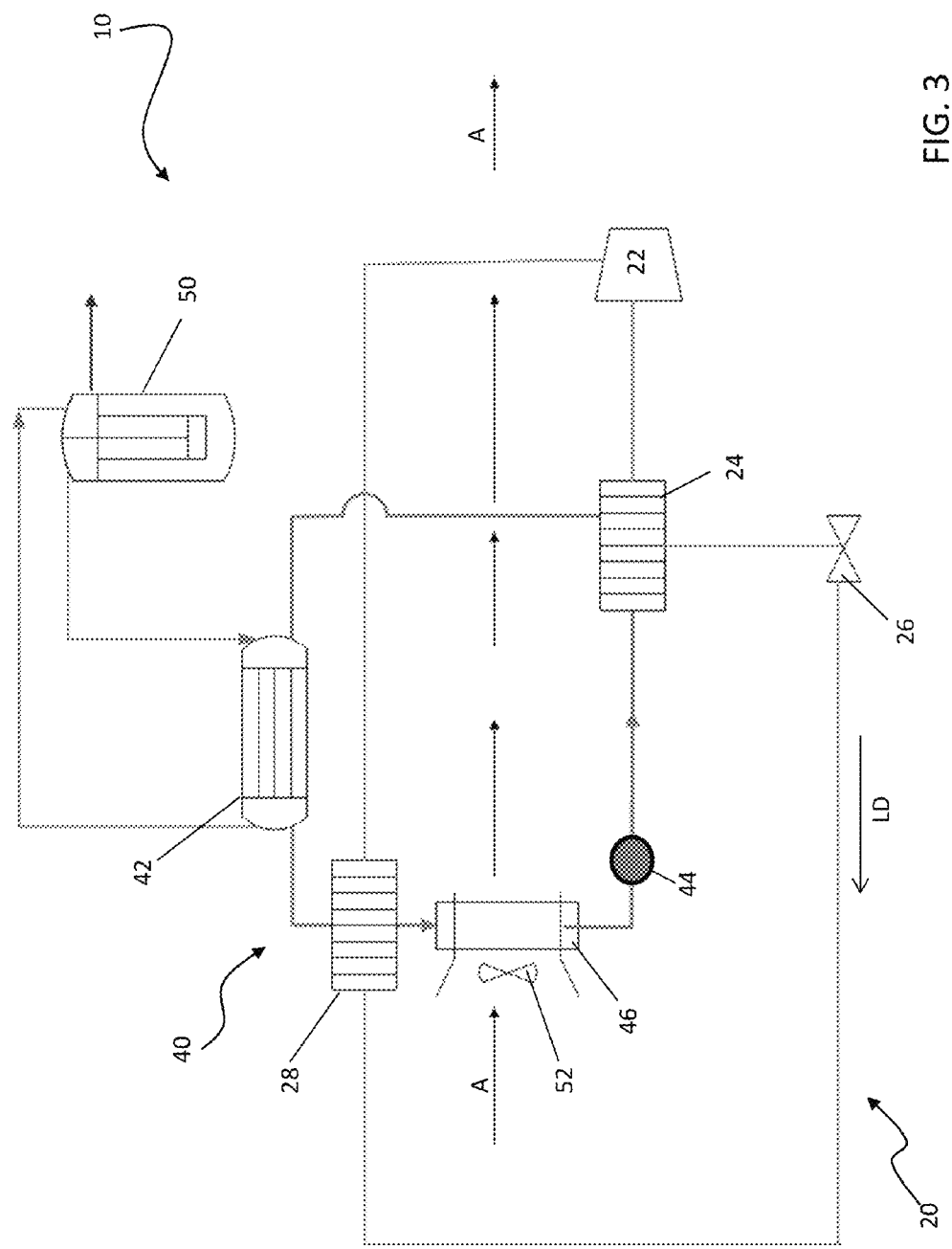
FIG. 3 is a schematic diagram of yet another air temperature and humidity control device according to an embodiment of the invention.

In another embodiment, illustrated in FIG. 2, the first contactor 42 is positioned downstream from the condenser 24 such that as the liquid desiccant LD passes through the condenser 24, the desiccant is heated. As the heated liquid desiccant flows through the at least one contact module 60 of the first contactor 42, the pressure differential created by the vacuum pump 52 across the porous sidewall 62 causes the liquid desiccant LD to release water vapor into the vacuum flow L2. The resultant liquid desiccant is more concentrated and hygroscopic than the desiccant entering the first contactor 42. At the same time, the contact module 60 of the first contactor 42, heated by the liquid desiccant LD flowing there through, may release heat to the vacuum flow L2 along the exterior side 66 of the contact modules 60. Thus, the contact modules 60 of the first contactor 42 may function to increase both the temperature and humidity of the vacuum flow L2.

With reference now to FIG. 3, the liquid desiccant LD flowing into the first contactor 42 is heated by the condenser 24 and is configured to warm the at least one contact module 60 of the first contactor 42 as it flows there through. Cold water from the water generator 56 is pumped through the first contactor 42, adjacent the external side 66 of the contact modules 60, in a direction opposite the flow of the liquid desiccant LD. As the heated liquid desiccant flows through the at least one contact module 60 of the first contactor 42, the vapor differential between opposing surfaces 64, 66 of the porous sidewall 62 causes the desiccant LD to release water vapor into the adjacent water flow L2. The resultant liquid desiccant LD is more concentrated and hygroscopic than the desiccant entering the first contactor 42. At the same time, the contact module 60 of the first contactor 42, warmed by the liquid desiccant LD flowing there through, releases heat to the water flow L2 along the exterior side 66 of the contact modules 60. Thus, the at least one contact module 60 of the first contactor 42 may function to increase both the temperature and humidity of the water flow L2 along its exterior side 66. In one embodiment, the first contactor 42 is configured as a hot water heater, such that the heated water returning to the water generator 50 from the first contactor 42 may be provided to another source.

Use of a liquid-liquid contactor 42 may eliminate unnecessary heating and subsequent cooling of the liquid desiccant LD to remove moisture therefrom. The pressure difference created by the external source 50 within the contactor 42 is enough to drive moisture from the desiccant LD. This minimizes the load on the refrigerant-liquid desiccant evaporator 30 and improves the overall efficiency of the air temperature and humidity control device 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air temperature and humidity control device comprising:
   a heat pump including a condenser, an evaporator, and a compressor;
   a humidity controller having a first contactor fluidly coupled to the evaporator, the first contactor including at least one contact module having a porous sidewall that defines an internal space through which a liquid desiccant flows; and
   a vacuum pump coupled to the first contactor and configured to generate a pressure difference between an internal side and an external side of the porous sidewall such that heat and/or water vapor transfers between the vacuum and the liquid desiccant.

2. The device according to claim 1, wherein the condenser is a refrigerant-air heat exchanger.

3. The device according to claim 1, wherein the liquid desiccant within the at least one contact module of the first contactor releases heat and/or water vapor to a flow created by the vacuum flow.

4. The device according to claim 1, wherein the porous sidewall is permeable to water vapor and impermeable to liquid desiccant.

5. The device according to claim 1, wherein the first contactor is positioned upstream from the evaporator.

6. The device according to claim 1, wherein the humidity controller further comprises:
   a second contactor fluidly coupled to the evaporator, including at least one contact module having a porous sidewall that defines an internal space through which liquid desiccant flows; and
   a blower for generating an airflow in communication with the sidewall of the at least one contact module of the second contactor.

7. An air temperature and humidity control device comprising a heat pump including a condenser, an evaporator, and a compressor;

a humidity controller having a first contactor fluidly coupled to second evaporator, the first contactor including at least one contact module having a porous sidewall that defines an internal space through which a liquid desiccant flows; and a liquid source, external to the heat pump and coupled to the first contactor such that a second liquid provided by the liquid source flows through the first contactor, adjacent the porous sidewall, such that heat and water vapor transfers from the liquid desiccant to the second liquid, wherein only heat transfer between the liquid desiccant and the second liquid cools the liquid desiccant.

8. The device according to claim 7, wherein the external liquid source is a water generator.

9. The device according to claim 7, wherein the porous sidewall is permeable to water vapor and impermeable to liquid desiccant.

10. The device according to claim 7, wherein the first contactor is positioned upstream from the evaporator.

11. The device according to claim 7, wherein the humidity controller further comprises:

a second contactor fluidly coupled to the evaporator, including at least one contact module having a porous sidewall that defines an internal space through which liquid desiccant flows; and a blower for generating an airflow in communication with the sidewall of the at least one contact module of the second contactor.

12. The device according to claim 11, wherein the second contactor is arranged downstream from the first contactor.

* * * * *